(12) United States Patent
Iverson et al.

(10) Patent No.: US 7,792,250 B1
(45) Date of Patent: Sep. 7, 2010

(54) METHOD OF SELECTING A WELLBORE CEMENT HAVING DESIRABLE CHARACTERISTICS

(75) Inventors: Benjamin J. Iverson, Duncan, OK (US); Joe Maxson, Duncan, OK (US)

(73) Assignee: Halliburton Energy Services Inc.

( * ) Notice: Subject to any disclaimer, the term of this patent is extended or adjusted under 35 U.S.C. 154(b) by 19 days.

(21) Appl. No.: 12/433,584

(22) Filed: Apr. 30, 2009

(51) Int. Cl.
*G01N 23/207* (2006.01)
(52) U.S. Cl. .......................................... 378/73; 378/70
(58) Field of Classification Search ............. 378/70–90
See application file for complete search history.

(56) References Cited

U.S. PATENT DOCUMENTS

| | | | |
|---|---|---|---|
| 4,565,578 A | 1/1986 | Sutton et al. | |
| 4,935,060 A | 6/1990 | Dingsoyr | |
| 5,159,980 A | 11/1992 | Onan et al. | |
| 5,293,938 A | 3/1994 | Onan et al. | |
| 5,346,012 A | 9/1994 | Heathman et al. | |
| 5,418,829 A * | 5/1995 | Nagano ........................ | 378/86 |
| 5,588,488 A | 12/1996 | Vijn et al. | |
| 5,688,844 A | 11/1997 | Chatterji et al. | |
| 5,826,669 A | 10/1998 | Zaleski et al. | |
| 5,913,364 A | 6/1999 | Sweatman | |
| 6,167,967 B1 | 1/2001 | Sweatman | |
| 6,234,251 B1 | 5/2001 | Chatterji et al. | |
| 6,258,757 B1 | 7/2001 | Sweatman et al. | |
| 6,330,917 B2 | 12/2001 | Chatterji et al. | |
| 6,593,402 B2 | 7/2003 | Chatterji et al. | |
| 6,715,553 B2 | 4/2004 | Reddy et al. | |
| 6,722,434 B2 | 4/2004 | Reddy et al. | |

(Continued)

FOREIGN PATENT DOCUMENTS

EP 1260812 A1 11/2002

(Continued)

OTHER PUBLICATIONS

Anthony, John W., et al., "Handbook of mineralogy," 2010, 1 page, Mineralogical Society of America.

(Continued)

*Primary Examiner*—Hoon Song
(74) *Attorney, Agent, or Firm*—Craig W. Roddy; Conley Rose, P.C.

(57) ABSTRACT

A method for determining the ability of a cement composition to withstand subterranean formation conditions comprising obtaining an experimental diffraction pattern of the cement composition, generating a theoretical diffraction pattern of the cement composition, comparing the experimental diffraction pattern with the theoretical diffraction pattern, refining the theoretical diffraction pattern using a structural refinement method, determining the relative fraction of the crystalline phases present in the cement composition from the theoretical diffraction pattern, and determining the ability of the cement composition to withstand subterranean formation conditions. A method for determining the ability of a cement composition to withstand subterranean formation conditions comprising obtaining an experimental diffraction pattern of the cement composition, generating a theoretical diffraction pattern of the cement composition, comparing the experimental diffraction pattern with the theoretical diffraction pattern, refining the theoretical diffraction pattern using a structural refinement method, wherein the structural refinement method provides both crystallographic data and compositional data related to the cement composition, and determining the ability of the cement composition to withstand subterranean formation conditions by evaluating the crystallographic data and compositional data.

22 Claims, 3 Drawing Sheets

U.S. PATENT DOCUMENTS

| | | | |
|---|---|---|---|
| 6,821,361 B2 * | 11/2004 | Fujimura et al. | 148/508 |
| 6,858,566 B1 | 2/2005 | Reddy et al. | |
| 7,184,517 B2 | 2/2007 | Kern | |
| 7,264,053 B2 | 9/2007 | Vargo, Jr. et al. | |
| 7,488,705 B2 | 2/2009 | Reddy et al. | |
| 7,530,396 B1 | 5/2009 | Reddy et al. | |
| 7,537,653 B2 | 5/2009 | Garcia Luna et al. | |
| 2006/0217270 A1 | 9/2006 | Vargo, Jr. et al. | |
| 2006/0272819 A1 | 12/2006 | Santra et al. | |
| 2007/0062691 A1 | 3/2007 | Reddy et al. | |
| 2009/0120640 A1 | 5/2009 | Kulakofsky et al. | |
| 2009/0137431 A1 | 5/2009 | Reddy et al. | |
| 2010/0108310 A1 * | 5/2010 | Fowler et al. | 166/245 |

FOREIGN PATENT DOCUMENTS

| | | | |
|---|---|---|---|
| EP | 1522847 A1 | 4/2005 | |
| EP | 1260812 B1 | 11/2006 | |

OTHER PUBLICATIONS

Baroid brochure entitled "STEELSEAL® lost circulation materials," Apr. 2008, 2 pages, Halliburton.

Baroid brochure entitled "STEELSEAL FINE™ lost circulation material," 2002, 1 page, Halliburton.

Bish, D. L., et al., "Modern powder diffraction," 1989, 1 page, Mineralogical Association of America, Washington.

Bruker AXS product information sheet, "DIFFRACplus TOPAS," http://www.bruker-axs.de/topas.html, Jun. 10, 2010, 2 pages, © 2010, Bruker AXS.

Chapuis, Gervais, "The Rietveld method: introduction to crystal structure refinement based on powder diffraction measurement," Nov. 15, 2006, 9 pages, Lausanne.

Collaborative computational project No. 14 (CCP14) available downloads, http://www.ccp14.ac.uk/tutorial/tutorial.htm, Jun. 10, 2010, 3 pages.

Cullity, B. D., et al., "Elements of x-ray diffraction," Third Edition, 2001, 3 pages, Prentice Hall.

FullProf Suite product information sheet, "FP_Studio," http://www.ill.eu/sites/fullprof/php/programs71b4.html?pagina=FP_Studio, Jun. 10, 2010, 1 page, © 2006, The FullProf Team.

GSAS homepage on CCP14, http://www.ccp14.ac.uk/solution/gsas/, Jun. 10, 2010, 2 pages.

Hallburton brochure entitled "Super CBL™ additive," Aug. 2007, 2 pages, Halliburton.

Materials analysis using diffraction (Maud) download information, http://www.ing.unitn.it/~maud/download.html, Jun. 6, 2010, 3 pages, © 1977-2010, Luca Lutterotti.

McCusker, L. B., et al., "Rietveld refinement guidelines," Journal of Applied Crystallography, 1999, pp. 36-50, vol. 32, International Union of Crystallography.

MDI products information sheet, http://www.materialsdata.com/products.htm, Jun. 10, 2010, 2 pages, © 2009, Materials Data Incorporated.

PANalytical product information sheet, "HighScore Plus," http://www.panalytical.com/index.cfm?pid=547, Jun. 10, 2010, 2 pages, © 2010, PANalytical B.V.

Pecharsky, Vitalij K., et al., "Fundamentals of powder diffraction and structural characterization of materials," 2003, 2 pages, Kluwer Academic Publishers, Boston.

Plank, J., et al., "Comparative study of the working mechanisms of chemically different cement fluid loss polymers," SPE 121542, 2009, pp. 1-26, Society of Petroleum Engineers.

Pöllmann, H., "TV-II: well integrity; P-2: well stability, cement corrosion," Mar. 2008, 1 page.

Rietica information sheet, http://www.rietica.org/, Jun. 10, 2010, 1 page.

Rietveld, H. M., "A profile refinement method for nuclear and magnetic structures," http://www.ccp14.ac.uk/ccp/web-mirrors/hugorietveld/xtal/paper2/paper2.html, 1969, 13 pages, J. Appl. Cryst.

Rietveld, H. M., "Line profiles of neutron powder-diffraction peaks for structure refinement.," http://www.ccp14.ac.uk/ccp/web-mirrors/hugorietveld/xtal/paper1/paper1.html, 1967, 3 pages, Acta Cryst.

Rietveld, Hugo M., "The Rietveld method—the early days: a retrospective view," http://www.ccp14.ac.uk/ccp/web-mirrors/hugorietveld/xtal/paper3/paper3.html, Dec. 8, 2008, 4 pages.

Rietveld, Hugo, "The Rietveld method," http://home.planet.nl/~rietv025/, Dec. 8, 2008, 6 pages.

Speakman, Scott A., "Basics of Rietveld refinement," 2007, pp. 1-25, Massachusetts Institute of Technology.

Total brochure entitled "Total Finaprene® 401 styrene-butadiene TPE copolymer," Jun. 4, 2009, 1 page, Total Petrochemicals.

Total brochure entitled "Total Finaprene® 401 thermoplastic elastomer," Jun. 4, 2009, 1 page, Total Petrochemicals.

Total brochure entitled "Total Finaprene® 411 styrene-butadiene TPE copolymer," Jun. 4, 2009, 1 page, Total Petrochemicals.

Total brochure entitled "Total Finaprene® 411 thermoplastic elastomer," Jun. 4, 2009, 1 page, Total Petrochemicals.

Total brochure entitled "Total Finaprene® 435 styrene-butadiene TPE copolymer," Jun. 4, 2009, 1 page, Total Petrochemicals.

Total brochure entitled "Total Finaclear® 520 clear impact polystyrene," Jun. 4, 2009, 1 page, Total Petrochemicals.

Total brochure entitled "Total Finaclear® 521 clear impact polystyrene," Jun. 4, 2009, 1 page, Total Petrochemicals.

Total brochure entitled "Total Finaclear® 530 clear impact polystyrene," Jun. 4, 2009, 1 page, Total Petrochemicals.

Total brochure entitled "Total Finaclear® MBF clear impact polystyrene," Jun. 4, 2009, 1 page, Total Petrochemicals.

Understanding Cement website, "Cement hydration," http://www.understanding-cement.com/hydration.html, Dec. 10, 2008, 4 pages, WHD Microanalysis Consultants Ltd.

Understanding Cement website, "Concrete strength," http://www.understanding-cement.com/strength.html, Dec. 10, 2008, 3 pages, WHD Microanalysis Consultants Ltd.

Young, R. A., "The Rietveld method," 1993, pp. 1-4, 12-38, 43-54 plus 1 cover page and 1 publishing page, Oxford University Press Inc., New York.

* cited by examiner

METHOD OF SELECTING A WELLBORE CEMENT HAVING DESIRABLE CHARACTERISTICS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Zonal isolation refers to the isolation of a subterranean formation or zone from other subterranean formations. The subterranean formation or zone may serve as a source of a natural resource such as oil, or water. To achieve isolation of a subterranean formation, a wellbore is typically drilled down to the subterranean formation while circulating a drilling fluid through the wellbore. After the drilling is terminated, a string of pipe, e.g., casing, is run in the wellbore. Next, primary cementing is typically performed whereby a cement slurry is placed in the annulus and permitted to set into a hard mass, thereby attaching the string of pipe to the walls of the wellbore and sealing the annulus. Subsequent secondary cementing operations such as squeeze cementing may also be performed.

The physical characteristics of a cement are generally due to the nature of the cementitious materials formed as a result of the reaction of cement with water, that is, the hydration of the cement. As hydration occurs, the cement develops various phases which impart physical characteristics, (e.g., strength), to the cement. Once the cement is mixed with water, the hydration process begins and continues for so long as cementitious material and water are present in reactive forms and quantities.

One challenge encountered in using cements for long term zonal isolation is the potential loss of structural integrity of the cement formation due to the stresses associated with the extremity of the conditions (e.g. high temperature and/or high pressure) or the cyclical stresses occurring during the life of the wellbore. Such extended time periods and/or extreme conditions may detrimentally affect various physical and/or mechanical properties of the cement such as compressive strength and/or tensile properties and may result in the loss of structural integrity. Herein, strength retrogression generally refers to the loss of structural integrity of a cement formation due to a reduction in one or more physical and/or mechanical properties (e.g., compressive strength); the conditions under which the cement may lose structural integrity (e.g., high pressure, high temperature, extended time periods) are collectively termed structural integrity compromising (SIC) conditions. For example, the reduction in mechanical properties and increase in permeability of cement at temperatures above 230° F. often due to the formation of detrimental phases (usually defined as large crystalline structures) in a cement matrix may be termed strength retrogression. Conventional methods of mitigating strength retrogression may include the addition of silica to a slurry. However, this method suffers from a variety of drawbacks. Thus, it would be desirable to develop a methodology for selecting a cement composition that can withstand SIC conditions.

SUMMARY

Disclosed herein is a method for determining the ability of a cement composition to withstand subterranean formation conditions comprising obtaining an experimental diffraction pattern of the cement composition, generating a theoretical diffraction pattern of the cement composition, comparing the experimental diffraction pattern with the theoretical diffraction pattern, refining the theoretical diffraction pattern using a structural refinement method, determining the relative fraction of the crystalline phases present in the cement composition from the theoretical diffraction pattern, and determining the ability of the cement composition to withstand subterranean formation conditions.

Also disclosed herein is a method for determining the ability of a cement composition to withstand subterranean formation conditions comprising obtaining an experimental diffraction pattern of the cement composition, generating a theoretical diffraction pattern of the cement composition, comparing the experimental diffraction pattern with the theoretical diffraction pattern, refining the theoretical diffraction pattern using a structural refinement method, wherein the structural refinement method provides both crystallographic data and compositional data related to the cement composition, and determining the ability of the cement composition to withstand subterranean formation conditions by evaluating the crystallographic data and compositional data.

Further disclosed herein is a method for determining the ability of a cement composition to withstand subterranean formation conditions comprising curing samples of a cement composition for a plurality of cure times, obtaining experimental x-ray diffraction patterns of the cement composition cured samples, generating theoretical x-ray diffraction patterns of the cement composition cured samples, and refining the theoretical x-ray diffraction patterns of the cement composition cured samples relative to the experimental x-ray diffraction patterns using the Rietveld refinement method.

DETAILED DESCRIPTION

Figure 1:
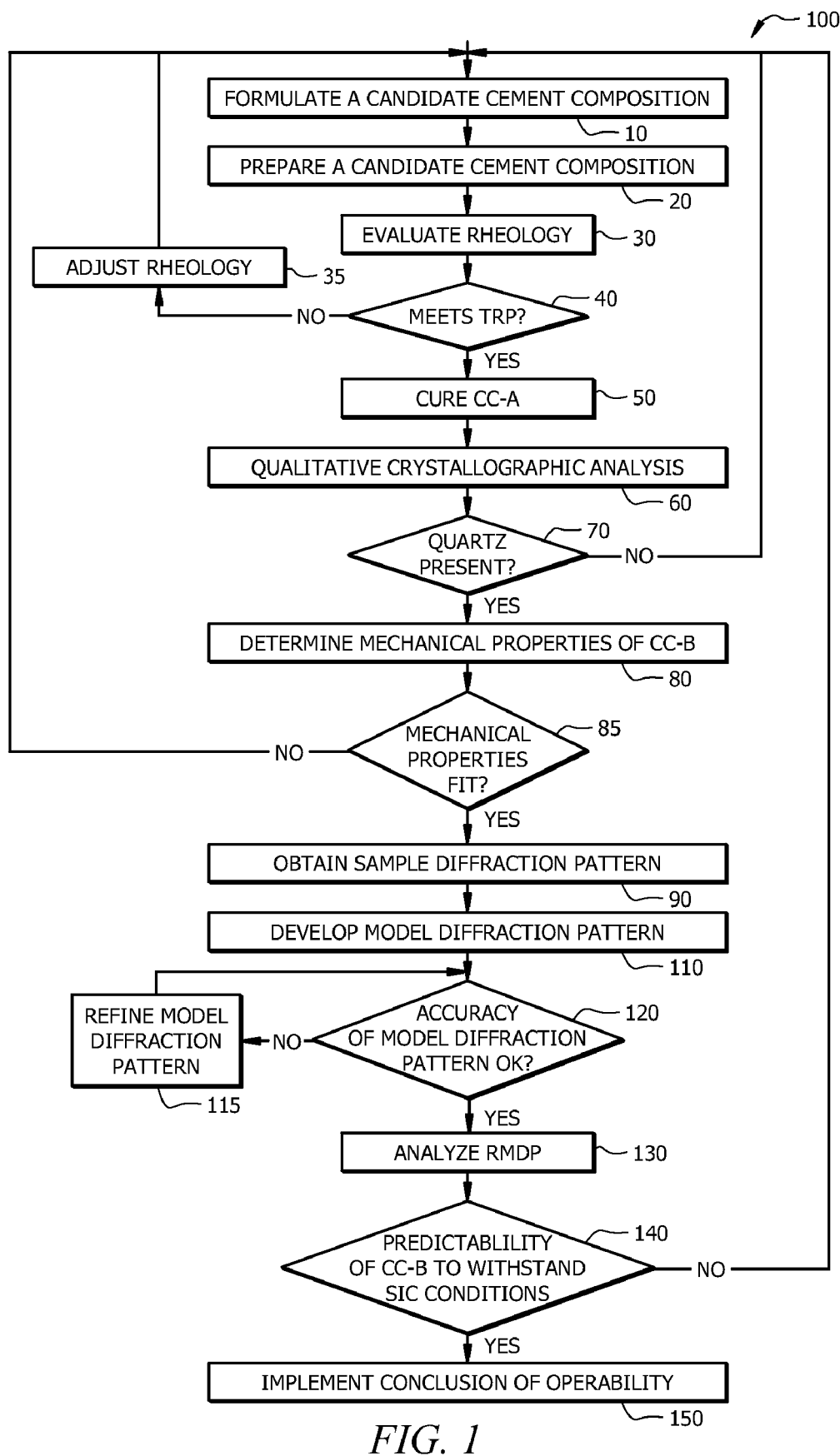
FIG. 1 is a flow-chart providing a general outline of the disclosed methodologies.

It should be understood at the outset that although an illustrative implementation of one or more embodiments may be provided herein, the disclosed methods may be implemented using any number of techniques. This disclosure should in no way be limited to the illustrative implementations, drawings, and techniques illustrated herein, including the exemplary designs and implementations illustrated and described herein, but may be modified within the scope of the appended claims along with their full scope of equivalents.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ." Reference to up or down will be made for purposes of description with "up," "upper," "upward," or "upstream" meaning toward the surface of wellbore and with "down," "lower," "downward," "downhole," or "downstream" meaning toward the terminal end of the well, regardless of the wellbore orientation. The various characteristics mentioned above, as well as other features and characteristics described in more detail below, will be readily apparent to those skilled in the art with the aid of this disclosure upon reading the following detailed description of the embodiments, and by referring to the accompanying drawings.

As will be recognized by one of ordinary skill in the art with the aid of this disclosure, in certain embodiments, some of the elements of the methods recited and described herein may be optional. Generally, that elements of the methods of the invention may be described and represented herein in a given order should not be construed as limiting the performance of those elements in accordance with the invention to any one particular order.

Disclosed herein are methodologies for the formulation and selection of a cement composition that can withstand SIC conditions. Hereinafter references to a "dry cement" are meant to refer to the admixture of dry cementitious components which have not yet been mixed with a liquid; references to a "cement slurry" are meant to refer to a mixture of cementitious material and a liquid (e.g., water) prior to setting or curing; and references to a "cured cement" refer to a cement slurry which has set, hardened, or otherwise cured. It is also to be understood that references made to "cement," "candidate cement composition," and "cement composition" are meant to refer generally to a dry cement, the cement slurry formed from a dry cement, or the cured cement formed by the curing of a cement slurry, but in no particular state.

A method for the formulation and selection of a cement composition that can withstand SIC conditions comprises formulation of a candidate cement composition, analysis of the candidate cement composition and placement of a cement composition meeting a predefined set of expectations into the wellbore. As used herein, "candidate cement composition" is meant to refer to a cement composition of potential or putative ability to withstand SIC conditions. Each of the foregoing elements comprising this methodology is described in greater detail below.

Referring to FIG. 1, in an embodiment, the method 100 begins with the formulation of a candidate cement composition 10. The candidate cement composition may be formulated to meet some baseline set of physical property expectations which were developed by an evaluation of a subterranean formation to which the cement composition is to be introduced. Such evaluations may be carried out by one of ordinary skill in the art. For example, the evaluation may begin with retrieval of samples of the formation and reservoir for laboratory analysis. In particular, for a wellbore, the method may initiate with the gathering of information to produce a well log. Such information typically includes the characteristics of the earth formations traversed by the wellbore, and the location of subsurface reservoirs of the natural resource. Well logging is a technique for providing information to a formation evaluation professional, operator or driller regarding the particular earth formation being drilled. The collection of information relating to conditions downhole, which commonly is referred to as "logging," can be performed by several methods. In situ measurements of many formation properties via wellbore logging tools, such as logging-while-drilling (LWD) and wireline tools may be obtained by electromagnetic, acoustic, nuclear or electromechanical means, for example. These logging tools enable in situ determinations of properties such as the porosity, permeability, and lithology of the rock formations; reservoir pressure and temperature in the zones of interest; identification of the fluids present; and many other parameters. Methods of evaluating a subterranean formation and acquiring the information necessary to formulate a candidate cement composition may be selected by one of ordinary skill in the art with the benefits of this disclosure.

The method 100 may then proceed to block 20 and a candidate cement composition is prepared. In an embodiment, the candidate cement composition comprises water and a hydraulic cement. Herein a hydraulic cement refers to a cement that includes calcium, aluminum, silicon, oxygen, and/or sulfur and which sets and hardens by reaction with the water. Examples of hydraulic cements include but are not limited to Portland cements (e.g., classes A, C, G, and H Portland cements), pozzolana cements, gypsum cements, phosphate cements, high alumina content cements, silica cements, high alkalinity cements, and combinations thereof. In an embodiment, the candidate cement composition comprises a Portland cement.

The candidate cement composition may include a sufficient amount of water to form a pumpable cementitious slurry. The water may be fresh water or salt water, e.g., an unsaturated aqueous salt solution or a saturated aqueous salt solution such as brine or seawater. The water may be present in the amount from about 20 to about 180 percent by weight of cement, alternatively from about 28 to about 60 percent by weight of cement. The candidate cement compositions may comprise a density from about 4 lb/gallon to about 23 lb/gallon. In an embodiment, the candidate cement composition may comprise a density from about 12 lb/gallon to about 17 lb/gallon. In alternative embodiments, the candidate cement composition may be a low-density cement composition with a density from about 6 lb/gallon to about 14 lb/gallon.

In some embodiments, additives may be included in the candidate cement composition for improving or changing the properties thereof. Examples of such additives include but are not limited to defoamers, foaming surfactants, fluid loss agents, weighting materials, latex emulsions, dispersants, vitrified shale and other fillers such as silica flour, sand and slag, formation conditioning agents, hollow glass or ceramic beads or combinations thereof. Other mechanical property modifying additives, for example, elastomers, carbon fibers, glass fibers, metal fibers, minerals fibers, and the like can be added to further modify the mechanical properties. These additives may be included singularly or in combination. Methods for introducing these additives and their effective amounts are known to one of ordinary skill in the art with the benefits of this disclosure.

In an embodiment, the method 100 proceeds to block 30 and the rheological properties of the candidate cement composition are evaluated. As used herein, rheology refers to the study of the deformation and flow of matter. The rheological properties of the liquid (e.g., candidate cement slurry) are features that can be quantified to characterize its behavior, and the response of a liquid to a forced shearing flow is the basis for determining the specific rheological properties of a given liquid. As used herein, evaluating a property, quality, or characteristic may include, but is not limited to, performing one or more tests or other analytical processes so as to quantify, categorize, classify, or otherwise arrive at any such property, quality, or characteristic. Non-limiting examples of rheological properties that may be evaluated for a candidate cement slurry include density, viscosity, pumping time, pumping rate, thickening time, or combinations thereof. As used herein pumping time refers to the length of time necessary to pump a given volume of a cement slurry to a given depth in a wellbore, pumping rate refers to the range of rates at which a cement slurry is pumped to a given depth in a wellbore and thickening time refers to the time required for the cement composition to achieve 70 Bearden units of Consistency (Bc). At about 70 Bc, the slurry undergoes a conversion from a pumpable fluid state to a non-pumpable paste.

The method 100 then proceeds to block 40 where the evaluated rheological properties are compared to desired rheological properties or "targeted rheological properties." The targeted rheological properties (TRP) may be chosen so as to meet user-desired and/or process desired needs. For example, the TRP may be chosen by one of ordinary skill in the art with the benefits of this disclosure based on evaluations of the subterranean formation (as described previously herein), commercial objectives, and the like. As will be understood by one of ordinary skill in the art, the TRP may have a range of acceptable values for a particular property. Further, the weight given to a particular rheological property within a set of rheological properties evaluated may differ depending on any number of factors. For example, depending on the wellbore conditions, a user may emphasize the thickening time of the slurry as being a more significant factor than the pump time of the slurry. A candidate cement slurry meeting at least one of the TRP may be chosen for further analysis. Alternatively, the candidate cement slurry may not display a suitable rheology and the method proceeds to block 35 wherein the rheology of the candidate cement composition is adjusted.

In an embodiment, adjusting the rheological properties of the candidate cement slurry may comprise changing the relative portions of one or more components of the cement slurry and/or adding rheology modifying additives. In an embodiment, such rheology modifying additives may comprise dispersants, thickeners, accelerators, and retarders or combinations thereof.

Once the rheology of the cement composition has been adjusted the method 100 may then proceed to block 30 and the loop of evaluation of the rheology 30, comparison to TRP 40 and adjustment 35 repeated until a candidate cement slurry exhibiting TRP is formulated. In an alternative embodiment, a candidate cement slurry not exhibiting TRP may be discarded and the method proceeds to blocks 10 and 20 wherein another candidate cement composition is formulated and prepared. The candidate cement slurry displaying TRP is hereinafter denoted CC-A.

In an embodiment, the method 100 proceeds to block 50 and a sample of the CC-A is cured. The CC-A may be cured in an environment substantially approximating or simulating the environment in which the cement will potentially be implemented. For example, the CC-A may be cured at a temperature of greater than or equal to about 100° F., 125° F., 150° F., 175° F., 200° F., 210° F., 220° F., 230° F., 240° F., 250° F., 260° F., 270° F., 280° F. 290° F., 300° F., 325° F., 350° F., 375° F., 400° F., 425° F., 450° F., 475° F., 500° F., 525° F., or 550° F. In an additional embodiment, the CC-A may be cured at a pressure of greater than or equal to about 100 psi., 200 psi., 300 psi., 400 psi., 500 psi., 600 psi., 700 psi., 800 psi., 900 psi., 1,000 psi., 1,100 psi., 1,200 psi., 1,300 psi., 1,400 psi., 1,500 psi., 1,600 psi., 1,700 psi., 1,800 psi., 1,900 psi., 2,000 psi, 2,100 psi., 2,200 psi., 2,300 psi., 2,400 psi., 2,500 psi., 2,600 psi., 2,700 psi., 2,800 psi., 2,900 psi., or 3,000 psi. The cured CC-A is hereinafter denoted CC-B.

In an alternative embodiment, multiple samples of the CC-A are cured under different conditions (e.g., for different time periods) to form multiple CC-B samples. For example, samples of the CC-A may be cured for about 7 days, 30 days, 90 days, 180 days, 365 days, or combinations thereof. Each sample of the CC-B having been cured under the different conditions may then be individually subjected to the additional method steps to be described.

The method 100 further comprises analysis of the CC-B. Analysis of the CC-B may comprise determination of the mechanical and/or physical properties, and crystallographic structure.

In an embodiment, the method 100 proceeds to block 60 and a diffraction pattern of a CC-B sample upon exposure to an energy source is obtained. The diffraction pattern may comprise an electron diffraction pattern, a neutron diffraction pattern, an X-Ray diffraction pattern, an electromagnetic radiation diffraction pattern, or combinations thereof. In an embodiment, the diffraction pattern comprises an X-ray diffraction pattern. Methods of obtaining a diffraction pattern to provide crystallographic structural information are known to one of ordinary skill in the art. Examples of such methods are discussed in B. D. Cullity & S. R. Stock, Elements of X-Ray Diffraction (3rd ed., Prentice Hall 2001) (1959), which is incorporated by reference herein in its entirety. The diffraction of pattern of a sample of the CC-B is hereinafter denoted the "experimental diffraction pattern."

The experimental diffraction pattern may be subjected to qualitative crystallographic analysis in order to determine the presence or absence of one or more hydration products in the CC-B. The hydrated cement may form any number of hydration products such as calcium silicate hydrates (e.g., $CaO).SiO_2.0.9-1.25(H_2O)$; $CaO.SiO_2.1.1(H_2O)$; $0.8-1.5(CaO).SiO_2.1.0-2.5(H_2O)$), calcium aluminate hydrate, aluminate ferrite trisulfate, and the like. The hydration products in turn form crystalline phases of the CC-B such as for example quartz, xonolite, hematite, hibschite, calcite, anhydrite, tobermorite, various amorphous content, or combinations thereof. Quartz refers to a crystal made up of a lattice of silica ($SiO_2$) tetrahedra; xonolite is a crystal composed of calcium silicate monohydrate; hematite is the mineral form of iron(III) oxide ($Fe_2O_3$); calcite is a carbonate mineral and the most stable polymorph of calcium carbonate ($CaCO_3$); anhydrite is a mineral composed of anhydrous calcium sulfate ($CaSO_4$); and tobermorite is a calcium silicate hydrate ($Ca_5Si_6O_{16}(OH)_2.4(H_2O)$). In an embodiment, the qualitative crystallographic analysis may be performed to determine the presence or absence of any cementitious hydration product or crystalline phases formed therefrom. Hereinafter, the disclosure will focus on qualitative crystallographic analysis in order to determine the presence or absence of a quartz crystalline phase. However, it is contemplated that the presence or absence of any cementitious hydration product may be determined.

In an embodiment, the method 100 proceeds to block 70 and the presence or absence of quartz in the CC-B as indicated by a qualitative crystallographic analytical technique is evaluated. For example, the experimental diffraction pattern may be subjected to a peak pattern match (PPM) analysis wherein the experimental diffraction pattern is reviewed to determine the presence or absence of peaks that correspond to the quartz crystalline phase. Such a review may be manual or may be automated. In an embodiment, the experimental diffraction pattern serves as an input to a software program implemented on a computer of the type described herein. In such an embodiment, peaks in the experimental diffraction pattern may be compared to peaks in the diffraction pattern of samples of crystalline phase quartz (e.g., reference samples) to ascertain whether the patterns share commonality among the peaks sufficient to indicate the presence of a quartz crystalline phase. Other techniques for qualitative crystallographic analysis of the experimental diffraction pattern would be known to one of ordinary skill in the art with the aid of this disclosure and may be employed to determine the presence or absence of a quartz crystalline phase in the sample. As will be understood by one of ordinary skill in the art, qualitative crystallographic analytical techniques of the type described herein can only provide an indication as to the presence or absence of the materials that comprise a quartz crystalline phase and further evaluation of the composition, as will be described later herein, is required to conclusively establish the presence of a quartz crystalline phase.

In an embodiment, qualitative crystallographic analysis indicates the presence of quartz in the CC-B and the method proceeds to block 80, alternatively the qualitative crystallographic analysis indicates the absence of quartz in the CC-B and the method returns to block 10 and the loop represented by blocks 10 to 70 repeated until the presence of quartz in the CC-B is indicated.

In an embodiment, the method 100 proceeds directly from block 70 to block 90. Alternatively, the method proceeds from block 70 to block 80 and the mechanical and/or physical properties of the CC-B are determined. Nonlimiting examples of mechanical and/or physical properties which may be determined include compressive strength, Young's Modulus, elastic modulus, Poisson's Ratio, Tensile Strength, thickening time, transition time, zero gel time, or combinations thereof. Such properties may be determined by one of ordinary skill in the art using standardized methodologies for the evaluation of these properties. In an embodiment the method then proceeds to block 85 where the mechanical and/or physical properties are compared with one or more target mechanical property parameters (TMP). In an embodiment, where the mechanical properties meet one or more of the TMP, the method may proceed to block 90. Alternatively, where the mechanical properties fail meet one or more of the TMP, the method may return to block 10 and the steps represented by blocks 10 to 85 repeated until a CC-B meeting the TMP is formulated.

In an embodiment where the mechanical properties fail meet one or more of the TMP, such properties may be adjusted by the addition of the modulus-modifying additives (MMA) and Poisson's ratio modifying additives (PRMA). In an embodiment, the MMA is any polymer that is normally regarded as elastomeric as for example and without limitation polyisoprene, polybutadiene, polyisobutylene, polyethers, polyesters, etc. Alternatively, the MMA is any polymer that is normally regarded as thermoplastic as for example and without limitation polystyrene, poly(methacrylate), isotactic polypropylene, polyurethane, etc. Alternatively, the MMA may be a copolymer formed by combinations of monomers used in production of the aforementioned materials.

In an embodiment, the MMA is a thermoplastic elastomer having a tensile strength by itself in the range of from about 500 psi to about 4000 psi, recoverable elongation of from about 200% to about 1000% and thermostability in the temperature range of from about 30° F. to about 500° F. Such thermoplastic elastomers may be present in an amount of from about 5% to about 50%, alternatively from about 5% to about 30%, alternatively from about 5% to about 20%, all based on percentage by weight of the cement (% bwoc). Examples of suitable MMAs include the thermoplastic elastomers sold as FINAPRENE 411, FINAPRENE 435, FINAPRENE 401 and FINACLEAR by Total Petrochemical USA, Inc. or as KRATON products by Kraton Polymers. In an embodiment, the MMA (e.g., FINAPRENE 411 elastomer) has about the physical properties set forth in Table I.

TABLE I

| Property | FINAPRENE and other methods | Unit | Typical Value |
|---|---|---|---|
| Polymer type | | | SBS* |
| Structure | | | Radial |
| Physical appearance | | | Porous Crumb, Powder |
| Styrene/butadiene content | 1004 | % | 31/69 |
| Toluene solution viscosity | 1008 | mm2/s | 28.5 |
| Density at 23° C. | 2602 | g/cm$^3$ | 0.94 |
| Oil content, phr | 1010 | | — |
| Melt flow rate 190° C./5 kg | 1006 | g/10 min | <0.5 |

*SBS = styrene butadiene block copolymer

In an alternative embodiment, the MMA is a rubber. Examples of suitable rubbers include, the natural rubber (cis-1,4-polyisoprene) and most of its modified types; synthetic polymers including styrene/butadiene rubber; cis-1, 4-polybutadiene rubber or blends thereof with natural rubber or styrene/butadiene rubber; high styrene resin; butyl rubber; ethylene/propylene rubbers; neoprene rubber; nitrile rubber; cis-1,4-polyisoprene rubber; silicone rubber; chlorosulfonated rubber; polyethylene rubber; epichlorohydrin rubber; fluorocarbon rubber; fluorosilicone rubber; polyurethane rubber; polyacrylic rubber and polysulfide rubber. Such rubbers may be used either in the vulcanized or unvulcanized form.

Other copolymers that can be employed as MMAs include without limitation block copolymers of various olefins as for example ethylene/propylene copolymers wherein the ethylene block segments are generally considered elastomeric in nature and the polypropylene segments are generally considered semi-crystalline. Various elastomers and rubber compositions suitable for use as MMAs are disclosed in U.S. Pat. Nos. 5,688,844 and 5,293,938, each of which is incorporated by reference herein in its entirety.

Examples of suitable PRMAs are known to one skilled in the art and include without limitation flexible, compressible beads and resilient materials such as graphite carbon, liquids, non-aqueous fluids, solids, gases and the like. The resilient material may have a thermal expansion coefficient equal to or greater than about $1 \times 10-4$ K$-1$.

In an embodiment, the PRMA is a resilient material. Herein resilient materials refer to materials that are able to reduce in volume when exposed to a compressive force and return back to about their normal volume (e.g., pre-compressive force volume) when the compressive force subsides. In an embodiment, the resilient material returns to about the normal volume (e.g., to about 100% of the normal volume) when the compressive force subsides. In an alternative embodiment, the resilient material returns to a high percentage of the normal volume when the compressive force subsides. A high percentage refers to a portion of the normal volume that may be from about 70% to about 99% of the normal volume, alternatively from about 70% to about 85% of the normal volume, and further alternatively from about 85% to about 99% of the normal volume. Such materials may be solids, liquids or gases. An example of such a material is a gas, such as nitrogen, air or hydrogen present in the form of foam bubbles. The volume of the gas phase needed to make a cement composition resilient may be in the range of from about 0.01% to about 40% by volume of the cement composition under downhole conditions. The gas phase may be incorporated in the cement composition by any means known to one skilled in the art. Alternatively, the gas phase may be incorporated by injecting appropriate volume of the gas. Alternatively, the gas phase may be generated by the use of solid materials incorporated in the cement slurry that generate gases upon exposure to the cement slurry or under downhole conditions. An example of a suitable gas generating material includes the cement additive sold as SUPER CBL by Halliburton Energy Services. This material generates hydrogen gas upon exposure to cement slurries under downhole conditions. Other gas generating material compositions suitable for incorporation into cement slurries are described in U.S. Pat. Nos. 6,715,553, 6,722,434, and 6,858,566, the relevant disclosures of which are incorporated by reference herein.

Solid materials or particles which undergo reversible volume changes with changes in stress may also be used as a PRMA. Such resilient solids may have thermal expansion coefficients greater than about $1 \times 10^{-4}$ K-1. Without limitation, examples of suitable resilient solids include natural rubber, elastomeric materials, styrofoam beads, polymeric beads, and combinations thereof. Natural rubber includes rubber and/or latex materials derived from a plant. Elastomeric materials include thermoplastic polymers that have expansion and contraction properties from heat variances. Examples of suitable elastomeric materials include without limitation a styrene-butadiene copolymer, neoprene, synthetic rubbers, vinyl, thermoplastics, and combinations thereof. Without limitation, examples of suitable synthetic rubbers include nitrile rubber, butyl rubber, polysulfide rubber, EPDM rubber, silicone rubber, polyurethane rubber, and combinations thereof. In some embodiments, the synthetic rubber comprises rubber particles from processed rubber tires (e.g., car tires, truck tires, and the like). The rubber particles may be of any suitable size for use in a wellbore fluid. In an embodiment, the rubber particles are of a size from about 10 microns to about 20 microns. Without limitation, processing the rubber tires may include mechanically removing metal such as steel surrounding the inner core of the tire and thereafter shredding and grinding the tire into the desired particle size. In some embodiments, the PRMA and the MMA may be the same or different, and may be selected from any PRMA or MMA described herein.

In an embodiment, the PRMA is resilient graphite. Graphite has a laminar structure. Without being limited by theory, it is believed that the layers in such a laminar structure provide the graphite with the ability to reduce in volume upon exposure to a compressive force and thereby provide expansion volume in the annulus. For instance, as the compressive force is applied and increased, the layers become correspondingly closer together, which may result in a reduction in volume of the graphite. Upon alleviating such an applied compressive force, the layers may spread apart, which may result in an increase in volume of the graphite. In some embodiments, the graphite may return to about the volume it occupied before exposure to the compressive force.

Graphitic carbon-based materials generally are considered resilient if they have a resiliency of at least about 20% after compression at 10,000 psi. As used herein, the term "resiliency" refers to the percentage increase in sample volume after release of a compaction pressure and is defined by the following formula:

$$\% \ \text{Resiliency} = 100 \left( \frac{h_r}{h_o} - 1 \right)$$

wherein $h_o$ is the height of a column of the material being tested under the compaction pressure and $h_r$ is the height of the column of the material being tested after the compaction pressure is released. A resiliency test procedure is described in U.S. Pat. No. 5,826,669, the relevant disclosure of which is incorporated by reference herein.

An example of a suitable resilient carbon-based material includes without limitation a carbon additive having a particle size distribution d50 of less than about 20 microns sold as DESULCO 9090 RGC by Superior Graphite. Other examples of suitable graphites include without limitation the loss circulation additives, sold as STEELSEAL and STEELSEAL FINE by Baroid Drilling Fluids. An example of suitable particles comprising elastomeric styrene butadiene block or random copolymers is a styrene-butadiene random block copolymer sold as FINAPRENE 411 by Total Petrochemicals Elastomers USA, Inc. The resilient material used as a PRMA may be present in the range of from about 0.5 wt. % to about 30 wt. % by weight of the total cement composition. In an embodiment, any non-aqueous fluid with a thermal expansion coefficient higher than $2 \times 10^{-4}$ K$^{-1}$ may be used as the PRMA. Such fluids may be liquids or gases under ambient conditions. These fluids may be used as aqueous emulsions. The volume fraction of such fluids in total cement slurry volume may be in the range of from about 0.002 to about 0.3.

Once a CC-B having TMP has been obtained, the method 100 may then proceed to block 90 and the experimental diffraction pattern obtained in block 60 is further evaluated to derive quantitative crystallographic structural information. Quantitative crystallographic structural information that may be obtained from the experimental diffraction pattern includes without limitation lattice parameters, atomic positions, fractional occupancies, thermal parameters, relative phrase fractions, grain size, texture, and combinations thereof. For example, the experimental diffraction pattern may be analyzed by one or more programs that provide as an output quantitative crystallographic structural information of the type described herein. Methodologies for the determination of quantitative crystallographic structural information from an experimental diffraction pattern are known to one of ordinary skill in the art. In an embodiment, the experimental diffraction pattern obtained in block 60 is further subjected to quantitative crystallographic analysis so as to quantify the phase fraction of one or more crystalline phases present in the CC-B as will be described in more detail later herein.

In an embodiment, it may be difficult or even impossible to directly determine the phase fraction for each phase present within a cementitious composition. This may be due to the multiplicity of phases present within the cementitious composition. In such an embodiment, the phase fraction may be inferred from a model or theoretical representation of the candidate cement composition.

Referring to FIG. 1, the method 100 may proceed to block 110 and a theoretical diffraction pattern is developed. The theoretical diffraction pattern is intended to represent the diffraction pattern which would be produced by a cementitious material comprising a mixture of the crystalline phases indicated to be present in the CC-B sample. The phase fractions of each of the crystalline phases may be determined by first generating a theoretical diffraction pattern representing the candidate cement composition sample. The step represented by block 110 of method 100 entails utilizing as inputs previously-obtained qualitative and/or quantitative information (e.g., the presence or absence of a given phase and/or other crystallographic structure information) gathered in blocks 60 and/or 90 to calculate or otherwise develop a theoretical diffraction pattern. As will be explained in greater detail herein, the theoretical diffraction pattern may then be compared with the experimental diffraction pattern, and gradually adjusted so as to approach the experimental diffraction pattern. As the theoretical diffraction pattern approaches the experimental diffraction pattern, the crystallographic structure information utilized as an input to develop the theoretical diffraction pattern will reflect the crystallographic structure information of the CC-B. In an embodiment, this information is used to quantify the phase fraction of one or more crystalline phases present in the CC-B.

The theoretical diffraction pattern may be prepared manually, its preparation may be automated, or the preparation of the theoretical diffraction pattern may be combinations of manual and automated processes. In an embodiment, the preparation of a theoretical diffraction pattern is implemented via a computerized apparatus, wherein the preparation of a theoretical diffraction pattern is implemented in software on a computer or other computerized component having a processor, user interface, microprocessor, memory, and other associated hardware and operating software. Software implementing the preparation of a theoretical diffraction pattern may be stored in tangible media and/or may be resident in memory on the computer. Likewise, input and/or output from the software, for example ratios, comparisons and results may be stored in a tangible media, computer memory, hardcopy such a paper printout, or other storage device.

In an embodiment, the theoretical diffraction pattern is developed by one of ordinary skill in the art employing software programs known in the art for the generation of theoretical diffraction patterns. Such programs typically generate a theoretical diffraction pattern from a variety of data. For example, the theoretical diffraction pattern may be generated using information generated by the qualitative and quantitative crystallographic analysis of the experimental diffraction pattern conducted previously and accepted values for the crystallographic structural information of crystalline phases thought to be present. Nonlimiting examples of crystallographic structural information that may be utilized to generate the theoretical diffraction pattern are lattice parameters, atomic positions, fractional occupancies, thermal parameters, grain size, texture, and combinations thereof. Such information may be the result of the quantitative and qualitative analyses of the experimental diffraction pattern obtained previously (e.g., blocks 60 and 90) and/or may be obtained by one of ordinary skill in the art from a variety of reference materials including published literature and/or crystallographic databases such as IUCR and American Mineralogist. For example, the theoretical diffraction pattern may be developed utilizing some or all of the crystallographic information for the phases previously determined to be present (including, but not limited to, atomic positions, lattice parameters, and thermal parameters, fractional occupancies, grain size, texture, or combinations thereof, as well as information of the diffraction experiment run (such as X-ray wavelength and equipment geometry).

The amount of each phase present initially within the theoretical diffraction pattern may be assigned arbitrarily. Alternatively, one of ordinary skill in the art with the benefits of this disclosure may develop a theoretical diffraction pattern comprising all of the determined crystalline phases and arbitrarily assign the amount of each crystalline phase present initially. Alternatively, one of ordinary skill in the art may hypothesize as to the relative amounts of each crystalline phase on the basis of a variety of factors (e.g., appearance, physical properties, etc. . . . ) of the CC-B and thus assign the amounts of the crystalline phases present initially in the theoretical diffraction pattern on the basis of this hypothesis. In another embodiment, the amounts of crystalline phases present initially in the theoretical diffraction pattern may be set to equal amounts. As will be understood by one of ordinary skill in the art, the amount of information utilized in the preparation of a theoretical diffraction pattern will be a factor in determining the degree with which the theoretical diffraction pattern accurately reflects the sample diffraction pattern.

Referring again to FIG. 1, once a theoretical diffraction pattern has been developed (e.g., the amount of crystalline phases initially present in the theoretical have been selected, determined, and assigned), block 110, the method 100 proceeds to block 120 and the experimental diffraction pattern is compared to the theoretical diffraction pattern. A comparison of the theoretical diffraction pattern to the experimental diffraction pattern may involve a simple visual comparison of the two patterns to ascertain the accuracy with which the theoretical diffraction pattern reflects the sample diffraction pattern.

Alternatively, the accuracy with which the theoretical diffraction pattern reflects the experimental diffraction pattern may be determined using one or more algorithms which describe how well the theoretical diffraction pattern reflects the experimental diffraction pattern. The accuracy with which the theoretical diffraction pattern reflects the experimental diffraction pattern may be determined by calculating the goodness of fit, the residual value, the relative difference, or combinations thereof.

In an embodiment, the accuracy with which the theoretical diffraction pattern reflects the experimental diffraction pattern is determined by calculating the "goodness of fit." In an embodiment, the goodness of fit, represented by R/E, where R represents a residual value (described in detail later herein) and E represents the background (i.e., the contribution of some unmeasured aspect to a given pattern, often referred to as "noise") subtracted from the residual value, may be used to determine how well the theoretical diffraction pattern fits the experimental diffraction pattern. Additionally, the goodness of fit may be used to gauge whether too much or too little information (e.g., lattice parameters, atomic positions) has been supplied during generation and/or refinement of the theoretical diffraction pattern. Similarly, the residual value, which is the sum of the differences between the observations of the theoretical diffraction pattern and the observations of the experimental diffraction pattern, may be employed to determine the accuracy with which the theoretical diffraction pattern reflects the sample diffraction pattern. In these diffraction patterns, each peak of a diffraction pattern serves as a separate and distinct observation. In an embodiment, a goodness of fit when comparing the theoretical diffraction pattern to the experimental diffraction pattern is from about 1.0 to about 2.0, alternatively from about 1.0 to about 1.75; alternatively from about 1.0 to about 1.5. A goodness of fit of from about 1.0 to about 2.0 may indicate sufficient accuracy of the of the theoretical diffraction pattern.

In another embodiment, the accuracy with which the theoretical diffraction pattern reflects the experimental diffraction pattern may be analyzed via a "residual" value. A residual value (sometimes referred to as a "fitting error) is an observable estimate of an unobservable statistical error, in this case, the degree to which the theoretical diffraction pattern differs from the experimental diffraction pattern. Thus, by minimizing the residual value, represented by R, the accuracy with which the theoretical diffraction pattern reflects the experimental diffraction pattern will be increased. In an embodiment, the residual value is less than about 20%; alternatively less than about 15%; alternatively less than about 10%; alternatively less than about 5%. In an embodiment, a residual value of less than about 20% may indicate sufficient accuracy of the of the theoretical diffraction pattern.

In still another embodiment, the "difference pattern," that is the relative difference between the theoretical diffraction pattern and the experimental diffraction pattern, may also be used in analyzing the accuracy with which the diffraction theoretical pattern reflects the experimental diffraction pattern. The difference "line," is constructed using dimensionless values representing the relative difference between the theoretical diffraction pattern and the experimental diffraction pattern.

In an embodiment, the theoretical diffraction pattern reflects the experimental diffraction pattern with sufficient accuracy as determined by a goodness of fit, a residual value or both. In such an embodiment, the method 100 proceeds to block 130. In an alternative embodiment, the theoretical diffraction pattern reflects the experimental diffraction pattern with insufficient accuracy as determined by a goodness of fit, a residual value or both. In such an embodiment, the method 100 proceeds to block 115 wherein the theoretical diffraction pattern is refined to more accurately reflect the experimental diffraction pattern. Any method for the refinement of the theoretical diffraction pattern to more accurately reflect the experimental diffraction pattern may be employed. In a non-limiting example, the theoretical diffraction pattern may be refined by the adjustment of any number of factors that would be apparent to one of ordinary skill in the art with the benefits of this disclosure. For example, the theoretical diffraction pattern may be refined by adjusting the thermal parameters, accounting for atomic substitutions in the crystal structure, adding background parameters to the refinements, adjusting the Caglioti or other shape functions of the diffraction patterns, or combinations thereof.

In an embodiment, refinement of the theoretical diffraction pattern is carried out utilizing the Rietveld refinement method. The Rietveld refinement methodology refines user selected parameters to minimize the difference between an experimental pattern (e.g., the sample diffraction pattern) and pattern based on a hypothesized crystal structure and instrumental parameters (e.g., theoretical diffraction pattern). The Rietveld refinement method can be used to refine information about a single crystal structure at a time using a whole pattern fitting method. By refining information about a single crystal structure at a time, the Rietveld refinement method may be used to determine the relative amounts of each phase within a multiple-phase sample. The Rietveld refinement method uses a least squares approach to refine a theoretical line profile until it matches a measured profile. The principle of the Rietveld refinement method is to minimize a function, represented by R, the weighted profile value, which represents the difference between a calculated profile, represented by $y^{calc}$ and the observed profile, represented by $y^{obs}$:

$$R = \Sigma W_i \{y_i^{obs} - y_i^{calc}\}^2 / \Sigma W_i [y_i^{obs}]^2$$

where $y_i^{obs}$ is the observed intensity at step I, $y_i^{calc}$ is the calculated intensity, and $W_i$ is the weight. Rietveld refinement method is described in more detail in R. A. Young, The Rietveld Method, (Oxford University Press 1995), See also B. D. Cullity & S. R. Stock, Elements of X-Ray Diffraction (3rd ed., Prentice Hall 2001) (1959) which is incorporated in its entirety herein by reference.

In an embodiment, the Rietveld refinement method may be performed manually, may be automated, or may be combinations of manual and automated processes. In an embodiment, the Rietveld refinement method is implemented via a computerized apparatus, wherein the method is implemented in software on a general purpose computer or other computerized component having a processor, user interface, microprocessor, memory, and other associated hardware and operating software. Software implementing the method may be stored in tangible media and/or may be resident in memory on the computer. Likewise, input and/or output from the software, for example ratios, comparisons, and results, may be stored in a tangible media, computer memory, hardcopy such a paper printout, or other storage device. Nonlimiting examples of computer programs that may be suitable for use in carrying out the Rietveld refinement methodology include "GSAS+ ExpGUI" freely available at http://www.ccp14.ac.uk/solution/gsas/; "Fullprof" freely available at http://www.ill.eu/sites/fullprof/php/programs71b4.html?pagina=FP_Studio; "Rietica" freely available at http://www.rietica.org/; "PSSP" information on this program is available at http://powder.physics.sunysb.edu/programPSSP/pssp.html; "Maud" freely available at http://www.ing.unitn.it/~maud/download.html; "PowderCell" freely available at http://www.lmcp.jussieu.fr/sincris/logiciel/prg-powdercell.html; "Crystal Maker" commercially available from CrystalMaker Software, Ltd.; "PANalytical HighScore Plus" commercially available from PANalytica; "Bruker TOPAS" commercially available from Bruker AXS; "Jade" commercially available from Materials Data, Inc.; "Ruby," commercially available from Materials Data, Inc. or combinations thereof. One or more of these programs may also have the capability of performing one or more of the previously described methodologies disclosed herein.

In an embodiment, a theoretical diffraction pattern is refined using the Rietveld refinement method and compared to the experimental diffraction pattern as described previously herein. Refinement of the theoretical diffraction pattern and comparison to the experimental diffraction pattern (blocks 115 and 120) may continue iteratively until the theoretical diffraction pattern converges with the experimental diffraction pattern. Refinement of the theoretical diffraction pattern and comparison to the experimental diffraction pattern may be carried out manually or may be automated as previously described herein. Herein convergence refers to the point at which the theoretical diffraction pattern reflects with sufficient accuracy the experimental diffraction pattern, and the resultant theoretical diffraction pattern is referred to as the refined theoretical diffraction pattern (RTDP). Herein sufficient accuracy refers to the goodness of fit, residual value or both having values within the ranges disclosed previously herein. Hereinafter, the disclosure will focus on the use of the RTDP however it is contemplated that in some embodiments the theoretical diffraction pattern in the absence of refinement will accurately reflect the experimental diffraction pattern. In such embodiments, the theoretical diffraction pattern in the absence of refinement may be utilized in lieu of the RTDP.

In an embodiment, the method 100 proceeds to block 130 and the RTDP is analyzed to determine the composition of the CC-B sample. More particularly, the crystallographic structure, and information regarding the nature and amount of cementitious hydration products present in the CC-B may be determined by analysis of the RTDP. The analysis may be carried out by one of ordinary skill in the art with the benefits of this disclosure. In some embodiments, the crystallographic structure and information regarding the nature and amount of cementitious hydration products in the RTDP is generated by the software program used to carry out the refinement of the RTDP. Alternatively, information generated by the software program on the crystallographic structure of the RTDP may be transferred to another program for analysis and determination of the nature and amount of cementitious hydration products present in the RTDP. The RTDP which reflects with sufficient accuracy the experimental diffraction pattern is used as a surrogate for the experimental diffraction pattern. Thus, the information obtained from analysis of the RTDP is representative of the sample (i.e., CC-B). In an embodiment, the RTDP that is generated using the Rietveld method provides both compositional and crystallographic information. For example, the results of the Rietveld refinement may provide information on both the relative phase fractions of the hydration products in a CC-B and crystallographic parameters (e.g., lattice parameters, atomic positions) of those phase fractions.

Not intending to be bound or limited by any particular theory, it is believed that strength retrogression may be caused by the degradation or transformation of certain beneficial crystalline phases which may comprise a given cement. That is, a cement comprises one or more crystalline phases which impart certain beneficial physical characteristics to that cement. Where one or more of these crystalline phases is degraded or altered, the cement may lose the beneficial characteristics (e.g., strength) imparted by that particular phase. In an embodiment, the ability of the candidate cement composition to withstand SIC conditions is related to the phase fraction of beneficial crystalline phases in the CC-B. Alternatively, the ability of a candidate cement composition to withstand SIC conditions is related to the phase fraction of quartz in the CC-B.

In an embodiment, the method 100 then proceeds to block 140 and the ability of the CC-B to withstand SIC conditions is predicted. In an embodiment, the RTDP contains less than 0.1% quartz crystalline phase, alternatively, less than 0.01, 0.001, or 0.0001% quartz crystalline phase. The sample (i.e., CC-B) would then be predicted to be unable to withstand SIC conditions and method 100 would then proceed from block 140 to block 10 wherein another candidate cement composition is formulated and subjected to the methodologies described herein.

In embodiments wherein multiple CC-B samples are prepared as described previously herein each sample may be subjected to blocks 10 to 140 of method 100. In such embodiments, the phase fraction of quartz as a function of cure time for the candidate cement composition is determined. A quartz fraction which stabilizes at a non-zero fraction may indicate the presence of "reactive" quartz and the ability of the candidate cement composition to withstand SIC conditions. In an embodiment, the phase fraction of quartz over time for a candidate cement composition may be greater than about 1 wt. %, alternatively greater than about 5 wt. %, alternatively from about 1 wt. % to about 20 wt. %.

In an alternative embodiment, the phase fraction of quartz remains substantially similar over the time interval investigated. As used herein, substantially similar refers to a difference of equal to or less than about 1%, alternatively about 2.5%, alternatively about 5%, alternatively about 10%, alternatively about 20% over the cure times investigated. In an embodiment, the phase fraction of quartz remains substantially similar over the time interval investigated and the phase fraction of quartz is greater than zero. In such embodiments, further analysis of the mechanical properties of the composition and/or the testing of samples that have been cured over longer time periods may be carried out to determine the suitability of the cement formulation to withstand SIC conditions. In an alternative embodiment, the phase fraction of quartz remains substantially similar over the time interval investigated and the phase fraction of quartz assumes a zero value. In such embodiments, the composition may lack "reactive" quartz and/or beneficial crystalline phases and would be predicted to be unable to withstand SIC conditions. In embodiments where the CC-B is predicted to be unable to withstand SIC conditions the method 100 proceeds from block 140 to block 10 and another candidate cement composition is formulated and subjected to the methodologies disclosed herein.

In embodiments where a candidate cement composition is rejected or not selected (i.e., the method proceeds from block 140 to block 10), information obtained during the analysis of the candidate cement composition may be utilized in formulating another candidate cement composition.

In an embodiment, a candidate cement composition displays the ability to withstand SIC conditions by having a phase fraction of quartz and/or displaying a change in the phase fraction of quartz over time as described previously herein. The candidate cement composition may then be deemed operable for utilization under SIC conditions and denoted CC-X. In such embodiments the method 100 proceeds from block 140 to block 150 wherein the conclusion of operability is implemented.

In an embodiment, the method 100 proceeds to block 150 and implementing the conclusion of operability of the CC-X. Implementing the conclusion of operability may comprise utilizing the CC-X as a wellbore servicing composition.

The wellbore servicing compositions (e.g., CC-X) disclosed herein can be used for any purpose. In an embodiment, the wellbore servicing compositions disclosed herein are used to service a wellbore that penetrates a subterranean formation. It is to be understood that "subterranean formation" encompasses both areas below exposed earth and areas below earth covered by water such as ocean or fresh water. Servicing a wellbore includes, without limitation, positioning the wellbore servicing composition in the wellbore to isolate the subterranean formation from a portion of the wellbore; to support a conduit in the wellbore; to plug a void or crack in the conduit; to plug a void or crack in a cement sheath disposed in an annulus of the wellbore; to plug a perforation; to plug an opening between the cement sheath and the conduit; to prevent the loss of aqueous or nonaqueous drilling fluids into loss circulation zones such as a void, vugular zone, or fracture; to plug a well for abandonment purposes; to provide a temporary plug to divert treatment fluids; to provide a chemical packer to be used as a fluid in front of cement slurry in cementing operations; and to seal an annulus between the wellbore and an expandable pipe or pipe string. For instance, the wellbore servicing composition may viscosify in a loss-circulation zone and thereby restore circulation. The viscosified mixture can set into a flexible, resilient and tough material, which may prevent further fluid losses when circulation is resumed. The wellbore servicing composition may withstand substantial amounts of pressure, e.g., the hydrostatic pressure of a drilling fluid or cement slurry, without being dislodged or extruded. The wellbore servicing composition may provide a relatively viscous mass inside the loss-circulation zone. The wellbore servicing composition can also form a non-flowing, intact mass inside the loss-circulation zone. This mass plugs the zone and inhibits loss of subsequently pumped drilling fluid, which allows for further drilling. Methods for introducing compositions into a wellbore to seal subterranean zones are described in U.S. Pat. Nos. 5,913,364, 6,167,967, and 6,258,757, each of which is incorporated by reference herein in its entirety.

In an embodiment, the wellbore servicing compositions may be employed in well completion operations such as primary and secondary cementing operations. Said compositions may be placed into an annulus of the wellbore and allowed to set such that it isolates the subterranean formation from a different portion of the wellbore. The wellbore servicing compositions thus form a barrier that prevents fluids in that subterranean formation from migrating into other subterranean formations. Within the annulus, the fluid also serves to support a conduit, e.g., casing, in the wellbore.

In an embodiment, the wellbore in which the wellbore servicing compositions are positioned is a part of a multilateral wellbore configuration. It is to be understood that a multilateral wellbore configuration includes at least two principal wellbores connected by one or more ancillary wellbores. In secondary cementing, often referred to as squeeze cementing, the wellbore servicing composition may be strategically positioned in the wellbore to plug a void or crack in the conduit, to plug a void or crack in the hardened sealant (e.g., cement sheath) residing in the annulus, to plug a relatively small opening known as a microannulus between the hardened sealant and the conduit, and so forth, thus acting as a sealant composition. Various procedures that may be followed to use a wellbore servicing composition in a wellbore are described in U.S. Pat. Nos. 5,346,012 and 5,588,488, which are incorporated by reference herein in their entirety.

EXAMPLES

The embodiments having been generally described, the following examples are given as particular embodiments of the disclosure and to demonstrate the practice and advantages thereof. It is to be understood that the examples are presented herein as a means of illustration and are not intended to limit the specification of the claims in any manner.

In each of the following examples, four candidate cements were formulated to give dry cements which could be mixed with a given amount of water to arrive at a cement slurries having desirable rheological properties. The four slurry designs are referred to here as slurry designs #13, #14, #18, and #19, respectively. A sample of that candidate cement composition was prepared and allowed to cure at 550° F. at 1,000 psi. in a fresh water medium for differing time periods up to 180 days. Specifically, slurry designs #13 and #14 were prepared as two samples that were cured for 90 days and 180 days respectively; slurry design #18 was prepared as four samples that were cured for 7, 30, 90, and 180 days respectively; and slurry design #19 was prepared as three samples that were cured for 7, 30, and 90 days.

Figure 2:
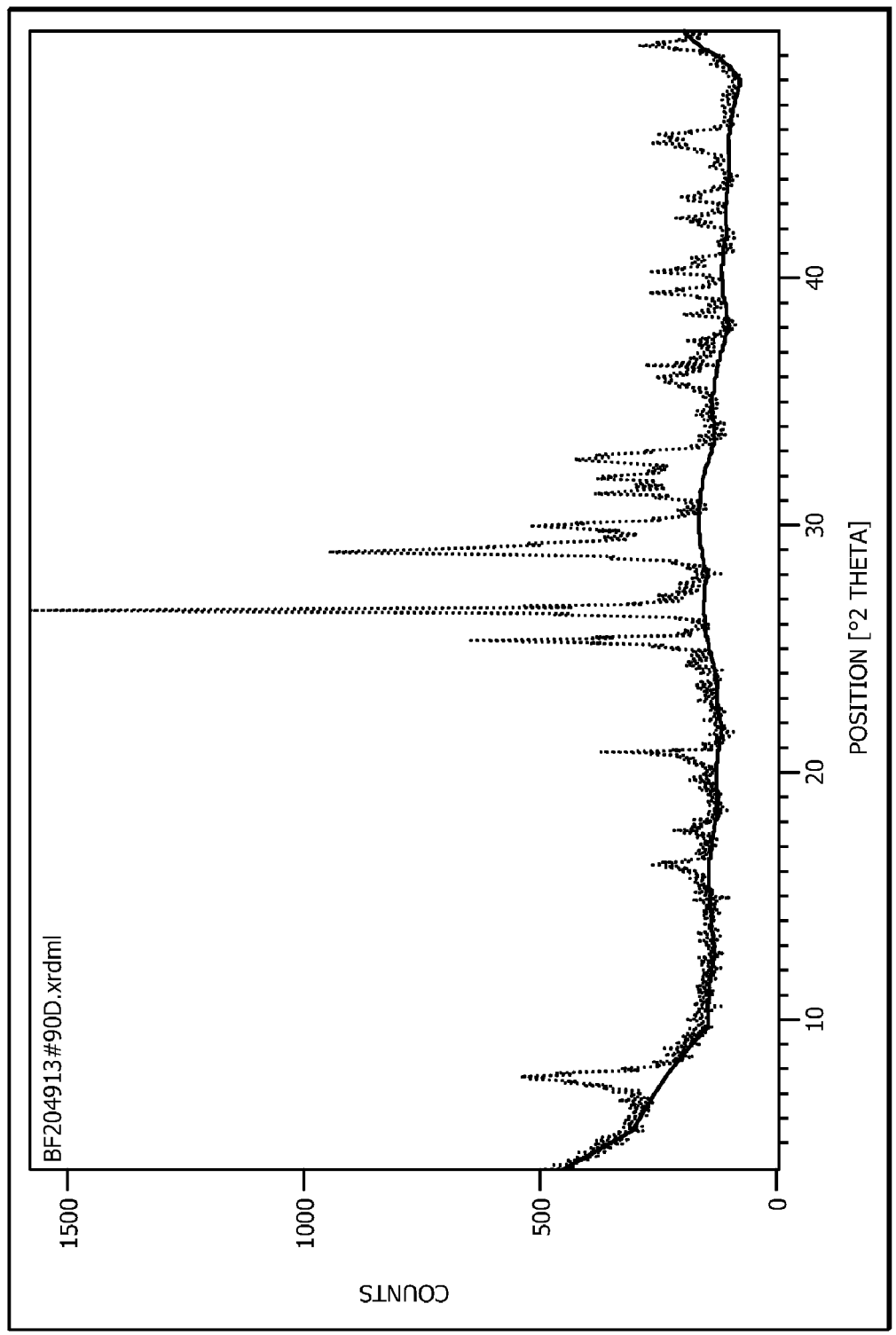
FIG. 2 is an X-ray diffraction pattern of a sample from Example 1.

X-Ray diffraction patterns of cured samples of the four candidate cement compositions were obtained using a Cu Kα diffractometer. These patterns were plotted as X-ray intensity versus position (2theta). An example of such a plot is provided in FIG. 2.

Figure 3:
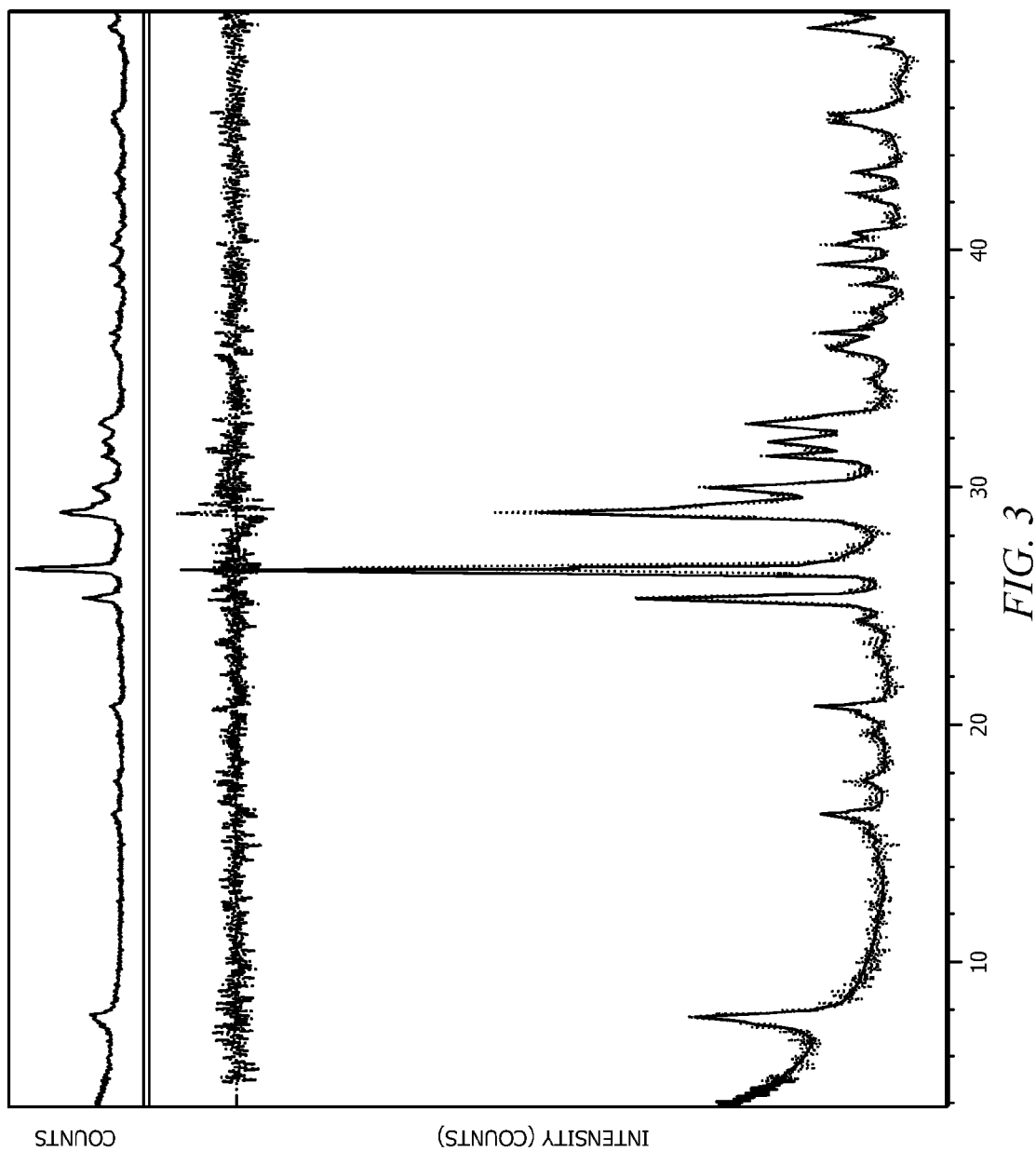
FIG. 3 is an image of the MDI Jade program for Rietveld refinement.

A theoretical diffraction pattern was then prepared using phase information obtained by analysis of the sample diffraction patterns and the theoretical crystal structure of the phases previously identified as present within the CC-B sample. The theoretical diffraction pattern was refined using the Rietveld refinement method which was also used to determine the relative phase fraction of the crystalline phases present for the four sample preparations, the Rietveld refinement method was carried out utilizing Jade v. 8 and v. 9 commercially available from MDI. A screen-shot of Jade is provided in FIG. 3. The crystalline phases present in the cured samples and the phase fraction of those crystalline phases at the specified cure times are set forth in Table II.

TABLE II

| SAMPLE | PHASES | 7 DAYS | 30 DAYS | 90 DAYS | 180 DAYS |
|---|---|---|---|---|---|
| #13 | Quartz | | | 15.2 | 5.6 |
| | Anhydrite | | | 5.7 | 4.9 |
| | Tobermorite | | | 43.4 | 48.5 |
| | Hibschite | | | 25.2 | 34.9 |
| | Calcite | | | 5.3 | 6.2 |
| | Amorphous | | | 5.3 | 0 |
| | R | | | 8.97 | 11.28 |
| | R/E | | | 1.27 | 1.19 |
| #14 | Quartz | | | 15.9 | 4.5 |
| | Anhydrite | | | 3.9 | 7 |
| | Tobermorite | | | 47.3 | 39.6 |
| | Hibschite | | | 27.5 | 20.7 |
| | Calcite | | | 5.4 | 5.7 |
| | Amorphous | | | 0 | 5.1 |
| | Tobermorite 2 | | | 0 | 17.4 |
| | R | | | 8.19 | 9.78 |
| | R/E | | | 1.473 | 1.0482 |
| #18 | Xonotlite | 67.6 | 63.5 | 52.8 | 38.9 |
| | Hematite | 16.6 | 10.9 | 11.2 | 9.9 |
| | Hibschite | 12.4 | 20.3 | 31.7 | 43.5 |
| | Quartz | 1.4 | 0.2 | 0.5 | 2.1 |
| | Calcite | 2 | 0 | 2.8 | 5.2 |
| | Amorphous | 0 | 5 | 1 | 0.4 |
| | R | 9.03 | 12.34 | 10.93 | 13.33 |
| | R/E | 1.72 | 1.12 | 1.54 | 1.19 |
| #19 | Xonotlite | 57.8 | 51.3 | 33 | |
| | Hematite | 13.2 | 17 | 14.1 | |
| | Hibschite | 18.5 | 10.4 | 44.2 | |
| | Quartz | 2.9 | 2.5 | 2.1 | |
| | Calcite | 0 | 10 | 6.5 | |
| | Amorphous | 7.5 | 8.9 | 0 | |
| | R | 11.97 | 12.29 | 14.25 | |
| | R/E | 1.23 | 1.25 | 1.24 | |

As can be seen from the relative phase fraction of quartz, each of slurry designs #13, #14, #18, and #19 had some portion of quartz present at the sampled time interval. Further, the generally decreasing phase fraction of quartz in each of these designs tends to indicate that the quartz present in each of these designs was reactive and present in a sufficient quantity. The relative phase fraction of quartz was used to predict that these cement designs would be able to withstand SIC conditions when utilized within a wellbore.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method for determining the ability of a cement composition to withstand subterranean formation conditions comprising:
   obtaining an experimental diffraction pattern of the cement composition;
   generating a theoretical diffraction pattern of the cement composition;
   comparing the experimental diffraction pattern with the theoretical diffraction pattern;
   refining the theoretical diffraction pattern using a structural refinement method;
   determining the relative fraction of the crystalline phases present in the cement composition from the theoretical diffraction pattern; and
   determining the ability of the cement composition to withstand subterranean formation conditions.

2. The method of claim 1 wherein the cement composition comprises a hydraulic cement.

3. The method of claim 2 wherein the hydraulic cement comprises a Portland cement.

4. The method of claim 1 wherein the diffraction pattern comprises an electron diffraction pattern, an X-ray diffraction pattern, neutron diffraction pattern, an electromagnetic diffraction pattern, or combinations thereof.

5. The method of claim 1 wherein the structural refinement method is a Rietveld refinement method.

6. The method of claim 1 wherein refining of the theoretical diffraction pattern is carried out until the theoretical diffraction pattern accurately reflects the experimental diffraction pattern.

7. The method of claim 6 wherein the theoretical diffraction pattern accurately reflects the experimental diffraction pattern when the goodness of fit is from 1.0 to about 2.0, the residual value is less than about 20%, or both.

8. The method of claim 1 wherein determining the relative fraction of the crystalline phases comprises determining the relative phase fraction of calcium silicate hydrates, cement hydration products, quartz, xonolite, hematite, hibschite, calcite, anhydrite, tobermorite, or combinations thereof.

9. The method of claim 1 wherein determining the relative fraction of the crystalline phases comprises determining the relative phase fraction of quartz and wherein the cement composition having an acceptable ability to withstand subterranean formation conditions is indicated by the phase fraction of quartz being greater than about 0.1%.

10. The method of claim 1 wherein determining the relative fraction of the crystalline phases comprises determining the relative phase fraction of quartz for a plurality of samples as a function of cure time and wherein the cement composition having an acceptable ability to withstand subterranean formation conditions is indicated by a substantially similar phase fraction of quartz as a function of cure time.

11. The method of claim 1 further comprising prior to obtaining an experimental diffraction pattern, measuring the rheological properties of the cement composition and comparing the measured rheological properties to targeted rheological properties.

12. The method of claim 11 further comprising adjusting the cement composition as needed until the measured rheological properties meet the targeted rheological properties.

13. The method of claim 1 further comprising analyzing the experimental diffraction pattern for detection of a qualitative indication of the presence of quartz in the cement composition.

14. The method of claim 13 further comprising adjusting the cement composition as needed until a positive qualitative indication of the presence of quartz in the cement composition is detected.

15. The method of claim 14 further comprising after detecting a positive qualitative indication of the presence of quartz in the cement composition, measuring the mechanical properties of the cement composition and comparing the measured mechanical properties to targeted mechanical properties.

16. The method of claim 15 further comprising adjusting the cement composition as needed until the measured mechanical properties meet the targeted mechanical properties.

17. The method of claim 1 further comprising preparing a quantity of the cement composition at a worksite and placing the cement composition in a wellbore.

18. A method for determining the ability of a cement composition to withstand subterranean formation conditions comprising:
   obtaining an experimental diffraction pattern of the cement composition;
   generating a theoretical diffraction pattern of the cement composition;
   comparing the experimental diffraction pattern with the theoretical diffraction pattern;
   refining the theoretical diffraction pattern using a structural refinement method, wherein the structural refinement method provides both crystallographic data and compositional data related to the cement composition; and
   determining the ability of the cement composition to withstand subterranean formation conditions by evaluating the crystallographic data and compositional data.

19. The method of claim 18 wherein the compositional data comprises the relative fraction of the crystalline phases present in the cement composition.

20. The method of claim 18 wherein the crystallographic data comprises a lattice parameter, an atomic position, a fractional occupancy, a thermal parameter, a grain size, a texture, or combinations thereof.

21. A method for determining the ability of a cement composition to withstand subterranean formation conditions comprising:
   curing samples of a cement composition for a plurality of cure times;
   obtaining experimental x-ray diffraction patterns of the cement composition cured samples;

generating theoretical x-ray diffraction patterns of the cement composition cured samples; and refining the theoretical x-ray diffraction patterns of the cement composition cured samples relative to the experimental x-ray diffraction patterns using the Rietveld refinement method.

22. The method of claim 21 wherein the refining of the theoretical x-ray diffraction patterns continues until the theoretical diffraction pattern and the experimental diffraction pattern have a goodness of fit of from 1.0 to about 2.0, a residual value of less than about 20%, or both.

* * * * *